Oct. 27, 1970 D. L. JOHNSTON ET AL 3,536,950
CALIBRATION ERROR DETECTION AND CORRECTION
IN A DOCUMENT READING SYSTEM
Filed July 15, 1968 4 Sheets-Sheet 1

INVENTORS
GORDON F. HOFFMANN
DAVID L. JOHNSTON
PAUL E. NELSON

BY Sughrue, Rothwell, Mion, Zinn & Macpeak
ATTORNEYS

Oct. 27, 1970 D. L. JOHNSTON ET AL 3,536,950

CALIBRATION ERROR DETECTION AND CORRECTION
IN A DOCUMENT READING SYSTEM

Filed July 15, 1968 4 Sheets-Sheet 2

United States Patent Office 3,536,950

Patented Oct. 27, 1970

3,536,950

CALIBRATION ERROR DETECTION AND CORRECTION IN A DOCUMENT READING SYSTEM

David L. Johnston and Paul E. Nelson, Rochester, and Gordon F. Hoffmann, Eyota, Minn., assignors to International Business Machines Corporation, Armonk, N.Y., a corporation of New York Filed July 15, 1968, Ser. No. 744,977
Int. Cl. H01j 29/70
U.S. Cl. 315—18 8 Claims

ABSTRACT OF THE DISCLOSURE

An L-shaped calibration mark on a document is scanned by the flying spot produced by a CRT beam up to three different times to sense the actual position of the mark relative to reference coordinates of the mark. Each scan consists of twelve vertical and twelve horizontal sweeps of equal length. The first scan is started at a first beam position determined by the reference coordinates. An error signal is generated if the starting beam position falls on the calibration mark, or if the mark is not sensed at the same point of each set of twelve sweeps. The error signal produces a second scan starting at a second beam position which is shifted a predetermined amount in one direction relative to the first beam position. If an error signal is again generated, then a third scan is started at a third beam position shifted in the opposite direction relative to the first beam position. If an error signal is generated on the third scan, the document is rejected. If no error is detected on a scan, any subsequent scans are inhibited, and correction voltages are summed with voltages corresponding to the reference co-ordinates to produce corrected deflection voltages which will properly position the scanning beam relative to the calibration mark and to other information on the document.

CROSS REFERENCES TO RELATED APPLICATIONS

The following U.S. patent and pending application, both assigned to the assignee of the present application, are incorporated by reference in the present application: U.S. Pat. No. 3,337,766, Malaby, Aug. 22, 1967. Application Ser. No. 672,551, filed Oct. 3, 1967, for "Format Control" by Hardin et al.

BACKGROUND OF THE INVENTION

Field of the invention

The invention relates to the field of character recognition and more particularly to the detection and correction of misregistration of a character-bearing document relative to a computer-controlled document scanning means.

Description of the prior art

In the prior art, an L-shaped calibration mark is placed on a document to be read. The document is transported to a reading station beneath a flying spot CRT scanner. A computer sends previously determined reference coordinates of the calibrate mark to the deflection circuits of the scanner. A calibrate format is entered, and a calibrate scan is initiated. The scan consists of twelve vertical sweeps and twelve horizontal sweeps. If the mark is sensed on any one of the sweeps, a valid mark is assumed to have been detected. If the mark is not detected on any of the sweeps, a total of ten scans are made all starting at the same coordinates, and if the mark still is not detected, the document is rejected.

Therefore, the object of the present invention is to resolve format calibrate errors caused by flaws, voids, light printing of format calibrate marks, the failure of the document to be stopped in the position corresponding exactly to the scanning field of the scanner, and drifts in the gain of the electronic system controlling the scanner.

In the error detection and correction system of this invention, up to three different scans of the calibration mark are made. Each scan has a starting point from which twelve vertical and twelve horizontal sweeps are made. On the first scan, the starting point is determined by previously calculated reference coordinates identifying the location of the calibrate mark. One problem with the prior art calibration system is that the discharge of static electricity from the card disrupts the character recognition circuits such that they incorrectly sense black, i.e. a mark, following the discharge. Therefore, in the present invention, a mark must be sensed by each set of twelve sweeps of a scan, and, furthermore, the mark must be sensed at the same position on each of the sweeps. If these conditions are not met, an error is indicated. An error is also indicated if the starting position of the beam is on the calibration mark.

When an error is detected, a second scan begins at a beam starting point which is displaced a predetermined amount from the beam starting point on the first scan. The twelve horizontal and vertical sweeps are made, and if an error is detected, a third scan is initiated at a starting point shifted the same predetermined amount from the starting point of the first scan but in a direction opposite from that in which the second scan was shifted. If an error is detected on the third scan, the document is rejected. On any scan on which an error is not detected, no additional scans are required, and the deflection voltage corresponding to the reference coordinates are corrected by an amount determined by the horizontal and vertical distances by which the actual position of the calibrate mark relative to the scanning beam differs from the reference coordinates. Therefore, the mechanical window or scanning field of the document will now be registered with the electronic window or scanning field of the CRT scanner. Furthermore, because of the requirement that the calibrate mark must be sensed in the same position on alternate sweeps of each set of sweeps, even though the discharge of static electricity from the document may cause one or more of the sweeps to sense black, black will not be sensed on all of the sweeps at the same position unless a valid calibrate mark is actually being sensed.

DETAILED DESCRIPTION OF AN EMBODIMENT OF THE INVENTION

Figure 1:
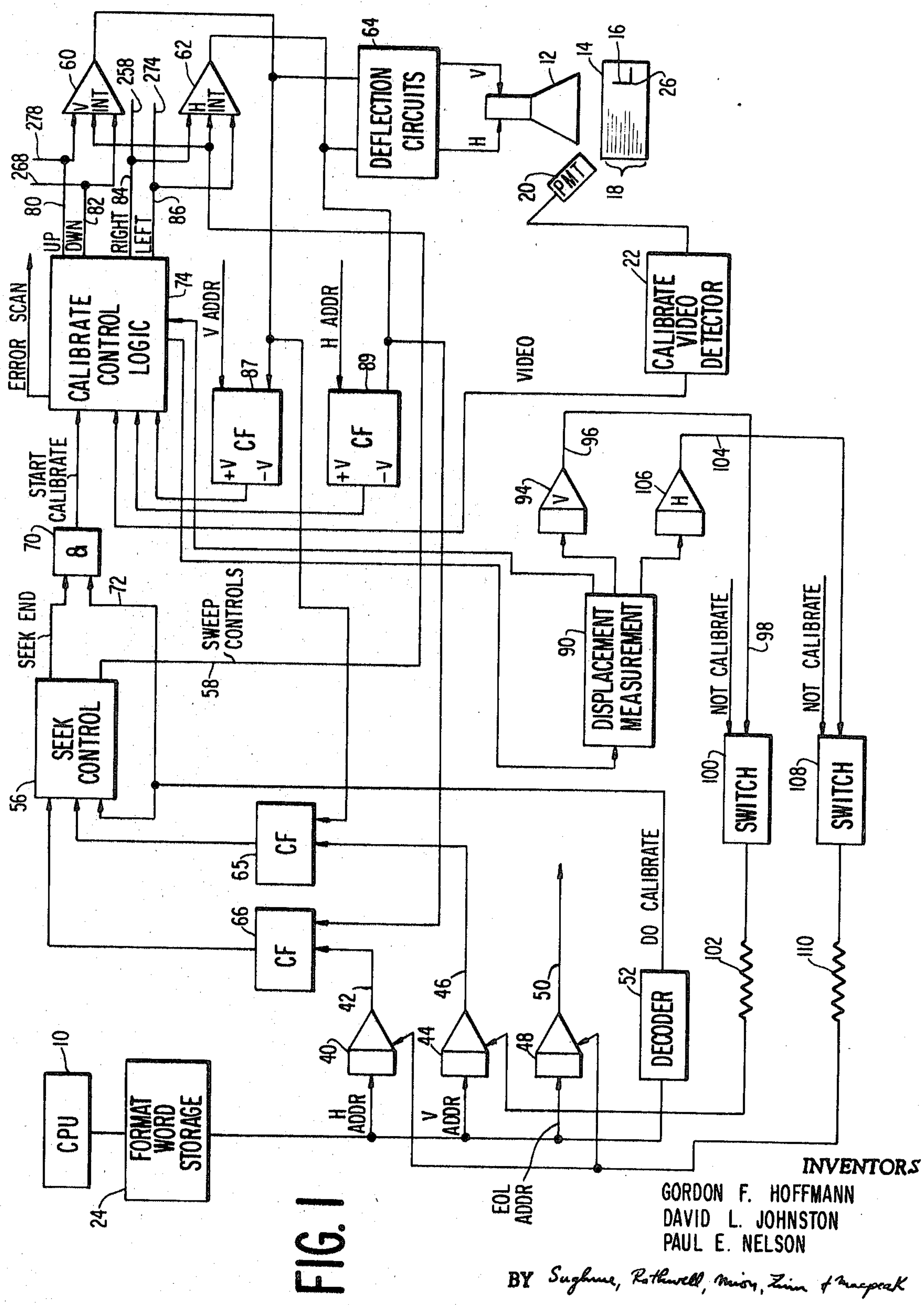
FIG. 1 is a block diagram of a character recognition system embodying the novel calibrate error detection and correction system of the invention.

FIG. 1 illustrates in block diagram form a computer-controlled document reading system in which a central processing unit (CPU) 10 controls deflection of the cathode ray beam in a flying spot scanner 12. A document 14 bearing an L-shaped calibration mark 16 and other character fields 18 are scanned by scanner 12. Light from the flying spot is reflected from the document and sensed by a photomultiplier tube 20 whose output is detected by a calibrate video detector 22.

When a document is first presented to the scanner 12, a calibrate control word is loaded by CPU 10 into a format word storage register 24. The control word contains in digital form the horizontal and vertical seek or reference coordinates of the point 26 of the calibrate mark 16. These coordinates have been determined in a previous off line operation. If the document which is sent into a reading station to be read by the scanner 12 is perfectly registered with respect to the scanning field of the scanner, then beam deflecting voltages corresponding to the horizontal and vertical coordinates will position the flying spot directly on the point 26. The present invention is directed to accurately detecting a valid calibrate mark and to correcting any displacement between the point 26 on a valid mark and the position of the flying spot when the spot is located at the position defined by the seek or reference coordinates.

Figure 3:
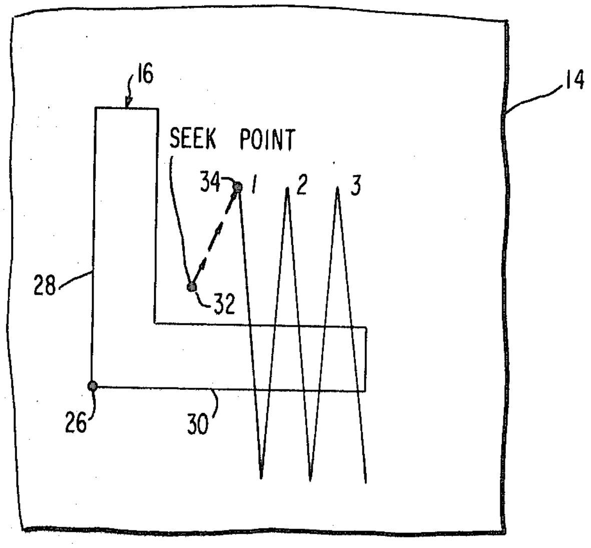
FIG. 3 illustrates the manner in which the calibrate mark on the document is scanned.

FIG. 3 is an enlarged view of a portion of document 14 bearing the calibration mark 16. The system is designed to correct for misregistration of ±200 mils in either the horizontal or vertical direction. The vertical leg 28 and the horizontal leg 30 of the mark 16 are each 400 mils long. The width of the printed lines forming the mark is at least 20 mils, and the system is designed to recognize 20 mils of black as valid mark. The 20 mils correspond to 4 microseconds of sweep time, i.e. each microsecond of sweep time covers 5 mils.

The manner in which the deflection circuits of the scanner 12 are controlled to reach a desired seek point forms no part of this invention and is described in detail in the aforementioned patent and patent application which are incorporated by reference in the present application. Briefly, however, the reference numeral 32 defines the actual position at which the flying spot is located when the cathode ray beam is deflected according to the seek coordinates derived from the format calibrating word. The spot is then deflected 200 mils vertically upward and 200 mils horizontally right to the sweep starting point 34. It is from this point that the first scan of 12 vertical sweeps and 12 horizontal sweeps is made. Each sweep is nominally 400 mils long. However, because the thickness of the lines forming the calibrate mark is 20 mils, the sweep will be at least 420 mils long since a valid mark is not to be detected unless 20 mils or 4 microseconds of black is sensed by the calibrate video detector 22. Once the beam has been deflected to point 34, twelve vertically downward sweeps 1, 2, . . . 12 are made. The sweeps are shown spread out for purposes of clarification, but in practice they are substantially superimposed upon one another even though there may be some horizontal scattering of the beam. The first scan is completed by then making twelve horizontal sweeps to the left from the point 34. When the beam seek point 32 and point 26 coincide, the point 34 is 200 mils from each of the legs of the L-shaped calibrate mark, thereby indicating that the document is accurately positioned relative to the electronic window or scanning field of the scanner 12.

For the condition illustrated in FIG. 3, where point 32 is displaced from point 26 and a valid calibrate mark has been detected, the horizontal and vertical displacements of the two points are converted to voltages and stored. These voltages, when summed with the deflection voltages which brought the flying spot to the seek or reference coordinate point 32 will deflect the beam to the point 26. These correction voltages are stored and summed with subsequent coordinates supplied by the CPU to deflect the beam to various locations for reading information on document 12. All these coordinates will now be corrected by the displacement voltages so that the mechanical window of the document and the electronic window of the scanner are now registered.

If point 34 falls directly on the mark 16, or the point 32 is more than 200 mils horizontally or vertically from point 26 on the mark, or a valid mark of 20 mils thickness is not detected in the same position on each of the vertical sweeps and in the same position on each of the horizontal sweeps, an error condition is indicated by the generation of an ERROR SCAN signal. When an error is indicated, a second scan is initiated. Twelve more vertical sweeps and twelve more horizontal sweeps are then taken. The vertical sweeps will be shifted horizontally 20 mils left from the sweeps of the first scan, and the horizontal shifts will be shifted vertically downward 20 mils from the horizontal shifts of the first scan.

If valid marks are detected in all 24 sweeps of the second scan, correction voltages are derived in the manner described in connection with scan 1. However, if an error condition is again indicated, a third scan is initiated and twelve more vertical and horizontal sweeps are made. The vertical sweeps will be shifted horizontally 20 mils right from the first scan, and the horizontal sweeps will be shifted vertically upward 20 mils from the first scan. If an error is also detected on this scan, the document is rejected. However, if a valid mark is detected on the scan, then the correction voltages are derived as previously described.

The advantage of the foregoing arrangement of three different scans of twelve horizontal and vertical sweeps each with the second and third scans being shifted 20 mils in opposite directions from the first scan is that, if an error is caused on the first scan by a void or flaw in the calibrate mark at the area traversed by the sweeping flying spot, it is likely that the ±20 mill vertical and horizontal shifts will cause at least one of the two additional scans to have all of its sweeps positioned on a properly printed part of the calibrate mark so that a valid mark will be detected when the document is in fact properly registered relative to the scanner, but where voids or flaws, i.e. less than 20 mils thickness in the mark, occur in the mark where the flying spot is sweeping.

If the point 34 falls on the mark, an error condition is indicated because, for example, on the vertical sweeps, if the sweep starting point 34 were on the upper edge of the horizontal leg 30 of calibrate mark 16, a mark would be sensed, but the mark would actually be misregistered by more than the 200 mil correction capability of the system. Therefore, a restriction imposed upon the error detecting correcting circuits of the system is that, if a starting point of a calibrate sweep falls in back on the document, then an error is indicated.

With the foregoing functional description of the manner in which the present invention operates, we will now return to FIG. 1 to complete the description of the block diagram of the character recognition system to which the invention is applied.

The horizontal address $H_{ADDR}$ is applied to the input of a horizontal address digital-to-analog converter or DAC 40. Such a DAC is well known in the art, and suffice it to say for purposes of this invention that it functions to store on its input a digital representation of an analog voltage which appears on its output. Consequently, DAC 40 has on its output line 42 an analog voltage corresponding to the horizontal address of the reference point 26 of the calibrate mark 16 on the document 14. In like manner, the vertical address $V_{ADDR}$ is applied to the input of a vertical DAC 44 which provides on its output line 46 an analog voltage corresponding to the vertical address of the point 26 on the calibrate mark.

An end of line address $EOL_{ADDR}$ is also applied from the format word storage register 24 to the input of an EOL DAC 48 which provides on its output 50 an analog voltage which functions to control the distance which the flying spot scans when information fields are being read from the document. In this particular system, assuming information appears on horizontal fields, the scan distance is eight inches. Field information from the format word register 24 is applied to a decoder 52 which provides on its output 54 a DO CALIBRATE signal which is applied to the input of a SEEK CONTROL 56. The SEEK CONTROL logic itself forms no part of the present invention and is described in detail in the aforementioned patent and pending application; however, suffice it to say that it functions to control the vertical and horizontal integrators driving the deflection circuits of the scanner so that the cathode ray beam is driven to the seek point or coordinates of the horizontal and vertical addresses stored in DAC's 40 and 44.

SEEK CONTROL 56 applies via line 58 current to a vertical integrator 60 and a horizontal integrator 62 whose outputs drive the horizontal and deflection circuits 64 of the cathode ray tube flying spot scanner 12. The outputs of the integrators 60 and 62 are applied to the inputs of comparators 65 and 66 respectively where they are compared with the voltages appearing on the outputs of the vertical address DAC 44 and horizontal address DAC 40, respectively. The outputs of comparators 65 and 66 are fed back to the input of SEEK CONTROL 56 which functions to provide a SEEK END signal to one input 68 and an AND gate 70 when the outputs of both comparators 65 and 66 are zero. Such a condition indicates that the outputs of the vertical and horizontal integrators 60 and 62 equal respectively the outputs of the address DAC's 44 and 40, thereby indicating that the cathode ray beam in the scanner has been deflected to the seek point, i.e. the coordinates called for by the horizontal address and vertical address. The DO CALIBRATE signal on line 54 is applied to the other input 72 of AND gate 70 to generate a START CALIBRATE signal which is applied to a box labeled CALIBRATE CONTROL LOGIC 74. This logic will be described in more detail below but suffice it to say at this point that it controls the error detection, scan shifting and calibration retry cycles previously functionally described with respect to FIG. 3, as well as controlling other functions.

Lines 80 and 82 between the calibrate control logic 74 and the vertical integrator 60 carry the up and down controls, respectively, for controlling the up and down sweeps of the vertical deflection of the scanner 12 and also the vertical shifts of the horizontal calibrate sweeps. Lines 84 and 86 between the calibrate control logic 74 and the horizontal integrator 62 control the right and left movement of the horizontal sweeps and the horizontal shifts of the vertical calibrate sweeps.

The output of vertical integrator 60 is also compared with the vertical calibrate address $V_{ADDR}$ in a comparator 87. The output of horizontal integrator 62 is compared with the horizontal calibrate address in a comparator 89. The outputs of both comparators are fed back to control logic 74 which controls the + and −200 mil calibrate sweeps of scanner 12. Comparators 87 and 89 actually control the generation of the vertical and horizontal sweep of the calibrate scans and are shown in more detail in FIG. 2.

Block 90 contains circuits for controlling displacement DAC's 94 and 106 for measuring the displacement between the reference coordinates of the calibrate mark and the actual position of the flying spot when the cathode ray beam of the scanner has been deflected to the position corresponding to these coordinates. Vertical displacement DAC 94 has an output 96 which is an analog voltage equal to the correction voltage which must be summed with the vertical address stored in DAC 44 to place the flying spot directly over the point 26 on the calibrate mark 16. It is this same correction voltage which must be summed with the vertical addresses of all subsequent seek point coordinates which are subsequently sent by the CPU to read other information fields of the document. This correction voltage is applied by a line 98 through a switch 100 which is closed only when the system is in the NOT CALIBRATE mode. The voltage is converted to a current by a resistor 102 and summed with the vertical address in the analog portion of the vertical DAC 44, so that the voltage appearing on line 46 is the corrected vertical deflection voltage.

In the same manner, the horizontal displacement error is applied from the horizontal displacement DAC 106 via line 104, a switch 108, and a resistor 110 to horizontal address DAC 40 to be summed with the horizontal address and to provide on output 42 a corrected horizontal voltage for properly positioning the beam relative to the information fields on the document. The output of DAC 106 is also applied to DAC 48 to correct the EOL address.

Figure 2:
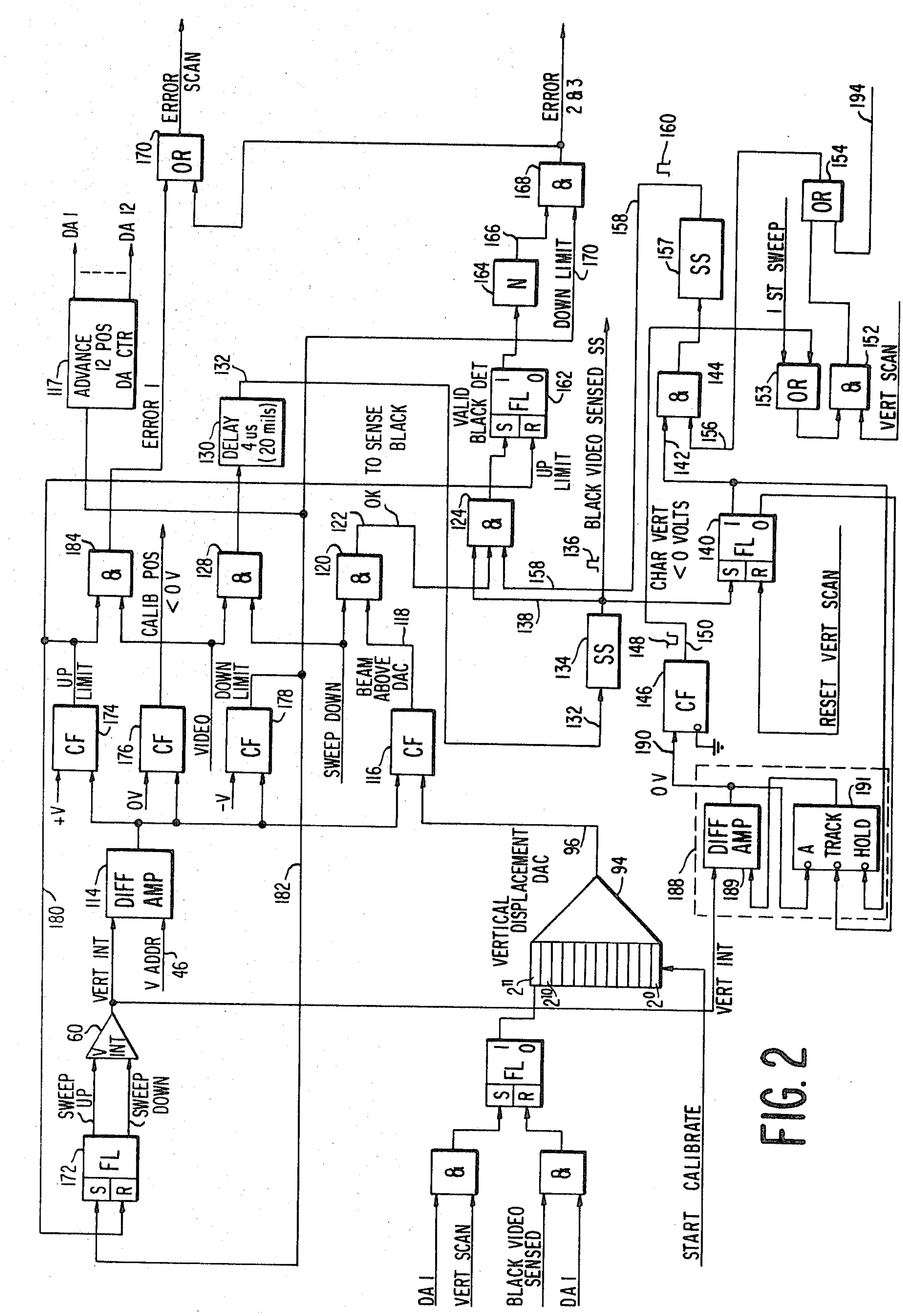
FIG. 2 is a logic block diagram of the error detection circuits.

Having briefly described the functional operation of the invention in conjunction with FIG. 3 and a block diagram operation of the character recognition system to which the invention applies, we will now turn to FIG. 2 which is a logic block diagram illustrating the invention per se in more detail. Since the error conditions described in conjunction with FIG. 3 apply to both the twelve vertical sweeps and the twelve horizontal sweeps of which scan, only the operation of the error detection and correction system for the vertical sweeps will be described in detail. However, it will be understood that identical circuitry will be used for detecting horizontal errors, determining horizontal displacement and correcting horizontal deflection voltages.

The output of the vertical integrator 60 is applied to a vertical calibrate differential amplifier 114 whose other input is the vertical address voltage from line 46 of the vertical DAC 44. Amplifier 114 comprises the vertical position of the scanning beam with the vertical address of the beam as called for by the output of DAC 44.

Referring to FIG. 3, the upper limit of a vertical sweep is defined by a deflection voltage of $-V=4$ volts and the lowest position of a vertical sweep is defined a deflection voltage $-V=-4$ volts. When the beam has swept from its upper limit downwardly for a distance of 200 mils, the output of the vertical amplifier 114 is 0 volt. The output of the amplifier 114 is applied to one input of a discriminator of comparator 116. The other input of comparator 116 is from the output of the vertical displacement DAC 94. As described in the aforementioned patent and pending application, vertical DAC 94 actually consists of 12 vertical DAC's which are sequentially switched into operation during each sweep by a twelve position DA counter 117. The highest ordered DAC is represented by the binary number $2^{11}$ the next by $2^{10}$, and so on down to the lowest order DAC of $2^0$. The analogoutput voltage from the highest order DAC is set to zero volt corresponding to a distance of zero mils. If video is not sensed in the first 200 mils, the next vertical DAC is turned on and the output on the vertical DAC 94 on the second sweep is —2 volts etc. When video i.e., the calibrate mark, is sensed on a sweep, it means that the DAC was set down too far, so that the DAC is reset and the next DAC is gated on. In this way, the actual location of the horizontal leg of the calibrate mark is accurately determined by a trial and error method. Again, the manner in which the twelve vertical DAC's operate to locate the point at which the sweeping beam crosses the mark on the document is described in detail in the prior art which is expressly incorporated by reference, herein.

Let us look at the first vertical sweep of a calibrate scan. Comparator 116 provides a single output line 118 so long as the vertically downwardly sweeping beam is above the particular vertical DAC which is set. In this case, we assume that the highest order DAC is set at zero volt for the first sweep. An AND gate 120 is conditioned by the signal on line 118 so long as the downwardly sweeping beam is above the value assigned to the DAC which is switched on. A SWEEP DOWN signal from the calibrate control logic 74 is applied as the other input AND gate 120 to provide on the output 122 thereof a signal labeled OK TO SENSE BLACK, and this signal is applied as one input to another AND gate 124.

The video sensed by the photomultiplier tube 20 is detected by the calibrate video detector 22 and is applied via a line 126 to another AND gate 128 along with the SWEEP DOWN signal. The output of AND gate 128 is applied to a suitable delay circuit 130 which functions to provide an output on line 132 only if video is sensed for 4 microseconds which corresponds to 20 mils of black, the minimum amount of black which must be sensed to recognize a valid mark. The output from the delay circuit 130 fires a single shot 134 which provides a timing pulse 136 of approximately 4 microseconds duration, this pulse indicating the condition BLACK VIDEO SENSED. Pulse 136 is applied via line 138 to another input of AND gate 124.

The pulse 136 also sets a flip latch 140 to condition input 142 of an AND gate 144. A comparator 146 provides a signal 148 on line 150 each time each of the last eleven vertical sweeps reaches the point at which the calibrate mark was sensed on the first vertical sweep. Pulse 148 is applied through an OR circuit 153 and ANDed with a signal VERTICAL SCAN at AND gate 152 whose output is applied through an OR circuit 154 to the other input 156 of AND gate 144. On the first sweep of a scan, a 1ST SWEEP signal is applied through OR circuit 153 to condition AND gate 152 so that AND gate 144 is enabled. The output of AND gate 144 fires a single shot 157 which produces on line 158 another 4 microsecond pulse 160 which is applied to the third input of AND gate 124. Consequently, on each vertical sweep, when at least 20 mils of black is sensed, and the vertically downwardly sweeping beam is above the level set by the particular DAC which is switched on, and the scan is either on the first sweep, or on one of the 11 sweeps as the video is sensed at the same spot on each of the sweeps, an output appears from AND gate 124 to set a flip latch 162. The setting of this flip latch indicates that a valid mark has been detected and flip latch 162 is labeled VALID BLACK DETECT. However, if all the conditions represented by the three inputs to AND gate 124 have not been satisfied, then the flip latch 162 is not set and an inverter 164 conditions the upper input 166 of an AND gate 168. When the vertically sweeping beam has reached its down limit, the other input 170 is conditioned to indicate an error. The output of AND gate 168 is fed through an OR circuit 170 to provide an ERROR SCAN signal which indicates that a CALIBRATE RETRY must be made, i.e., another scan of twelve vertical and twelve horizontal sweeps must be made.

The other error condition which the invention senses is the one in which the calibrate mark is not sensed within the ±200 mil limits which have been established. In other words, the document is so poorly registered with respect to the scanner that the coordinates of the scanning beam cannot be corrected to compensate for the misregistration. When a flip latch 172 is set, the vertical integrator 60 is commanded to sweep vertically upward and the output voltages of the integrator is compared in the amplifier 114 with the vertical address appearing on line 46. The output of the amplifier is applied in parallel to three comparators or discriminators 174, 176 and 178. The other input to comparator 174 is the $+V=4$ volts corresponding to the upper limit of the vertically sweeping beam. The other input to comparator 176 is 0 volts corresponding to the center of the vertical sweep. The other input of comparator 178 is $-V=-4$ volts corresponding to the low limit of the vertical sweep. When the beam has deflected to its upper limit, the output of comparator 174 sends a pulse via line 180 to reset flip-flop 172, thereby commanding the integrator 60 to sweep down. Similarly, when the beam has reached its lower limit, the output of comparator 178 sends a pulse via line 182 to set flip-flop 172, thereby commanding the integrator 60 to sweep up. The output of comparator 174 is ANDed with the video on line 126 at an AND gate 184. Consequently, if video is sensed at the beginning or upper limit of the sweep, i.e. the beams starts in black, an error condition is indicated at the output of AND gate 784 and is transmitted through OR circuit 170 to again provide the error indication, ERROR SCAN. The output of comparator 178 is applied to the lower input 171 of AND gate 168 in order to sample AND gate 168 at the bottom of the sweep. It will be recalled that the output of AND gate 168 also provides the ERROR SCAN indication at the output of the OR circuit 170.

The output of vertical integrator 60 is also applied via a line 186 to the input of a logic circuit 188. The output line 190 of circuit 188 functions to provide a zero volt condition every time the vertically sweeping beam crosses the point at which black was detected on the first sweep. The zero volt condtion is compared against ground in the comparator or discriminator 146 to provide the pulse 148 which, it will be recalled, functions to fire single shot 157 to produce the pulse 160 which must occur on each sweep simultaneously with the detection of the black video. In other words, pulses 136 and 160 must occur at the same time in order for a valid mark to be detected. Otherwise, the error scan signal is generated. The logic circuit 188 consists of a differential amplifier 189 and a track hold 191 connected as shown. It will be recalled that flip latch 140 is set by the pulse 136 which represents BLACK VIDEO SENSED. Flip-flop 140 is reset at the end of the twelve vertical sweeps by the RESET VERTICAL SCAN signal which is made available at the end of the twelfth sweep of the set of twelve vertical sweeps.

As previously mentioned, corresponding circuitry is avaiable in the system for deflecting and correcting errors during the horizontal sweeps. The line 194 indicates that corresponding signals for the horizontal sweeping direction will also be applied through OR circuit 154 to apply the single shot 157.

Figure 4:
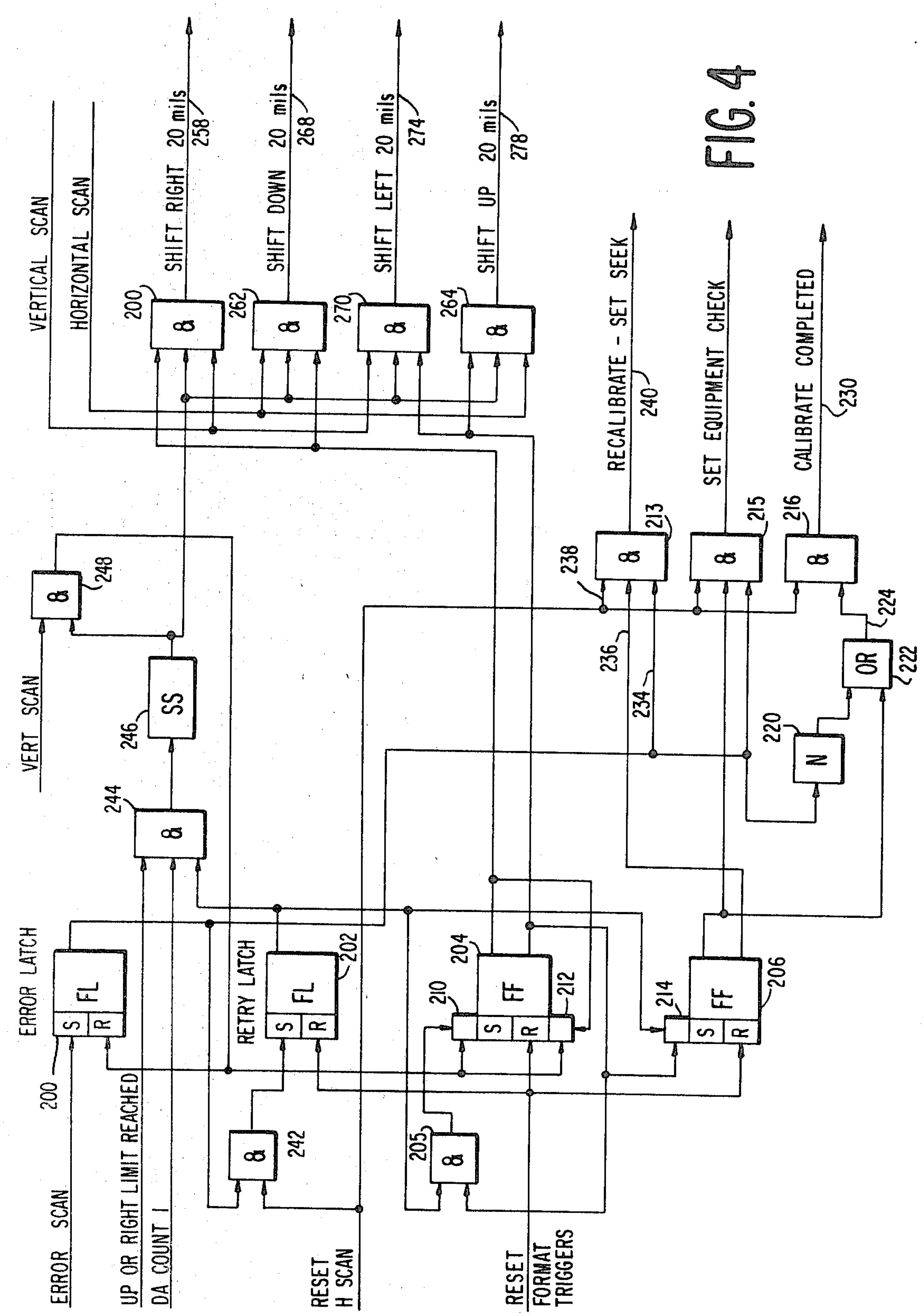
FIG. 4 is a logic block diagram illustrating the manner in which the calibrate scans are shifted.

FIG. 4 is a logic block diagram illustrating the manner in which the ±20 mil horizontal shift in the vertical sweeps and the ±20 mil vertical shifts in the horizontal sweeps are made. When an error condition is detected, the ERROR SCAN signal from OR circuit 170 in FIG. 2 sets a calibrate error flip latch 200. The flip latch 202 and flip-flops 204 and 206 are reset at the time the CPU leads the format storage register 24 and sends the SEEK or reference coordinates of the calibrate mark. This reset signal is labeled RESET FORMAT TRIGGER and is applied to the line 208 which is connected to the reset inputs of the latches 202, 204 and 206. The blocks 210, 212 and 214 on the flip-flops 204 and 206 represent AC gates. We will also assume that error latch 200 is reset.

When the beam has reached the SEEK point or reference coordinates of the calibrate mark, the SEEK END signal is generated by the seek control 56 (FIG. 1), and START CALIBRATE is generated. At the end of the first scan, i.e. after twelve vertical and twelve horizontal sweeps have been made, AND gate 216 is sampled by the signal RESET HORIZONTAL SCAN provided at the end of the twelve horizontal sweeps. The set output of flip latch 200 is applied via lines 218 and inverter 220 through an OR circuit 222 to the lower input 224 of AND gate 216. The upper input 226 of AND gate 216 is conditioned at the end of each scan by the signal RESET HORIZONTAL SCAN. Consequently, if no error occurs on the first scan of twentyfour sweeps, a CALIBRATE COMPLETED signal appears on line 230 at the output of AND gate 216 and is sent to the control panel to light lamp 294.

However, if an error does exist on the first scan, the ERROR SCAN signal on the input 232 of latch 200 sets the latch. The set condition of latch 200 conditions the lower input 234 of AND gate 213. The reset condition of flip-flop 206 conditions the center input 236, and the RESET HORIZONTAL SCAN at the end of the scan conditions the upper input 238 to generate on line 240 a signal which commands the SEEK CONTROL to again drive the deflection circuits to the seek point or reference coordinates of the calibrate mark. However, as previously described, it is now desired to shift the scanningbeam by 20 mils vertically and horizontally for the second scan. The RESET HORIZONTAL SCAN at the end of the first scan together with the set condition of the calibrate error latch 200 is ANDed at AND gate 242 to set the calibrate retry flip latch 202. When the beam has been moved from the seek point of reference coordinates to the top of its vertical limit, the AND gate 244 is enabled at DA COUNT 1 to fire a 4 microsecond i.e. 20 mils, single shot 246. The three inputs of AND gate 244 are conditioned by the DA count 1 from the DA counter 117, by a signal from the CALIBRATE CONTROL LOGIC 74 indicating the beam is at its upper limit, and by the set condition of the CALIBRATE RETRY LATCH 202. The output of single shot 246 and the VERTICAL SCAN SIGNAL enable AND gate 248 which resets latch 200 and sets flip-flop 204 which is conditioned by the output of AND gate 205. The set condition of flip-flop 204 the output of single shot 246 and the vertical scan signal conditions the three inputs of an AND gate 250 so that the 4 microseconds pulse passes via line 258 which is connected to the line 84 connected between the calibrator control logic 74 and the horizontal integrator 62. Consequently, the horizontal integrator output is shifted 20 mils to the right so that the twelve vertical sweeps on the second scan are shifted 20 mils to the right relative to the vertical sweeps on the first scan.

Similarly, at the start of the horizontal sweeps of the second scan, a HORIZONTAL CALIBRATE SCAN signal is applied to line 260 to condition AND gates 262 and 264. The output of single shot 246 and the set condition of flip-flop 204 completes the conditioning of AND gate 202 to send a 4 microsecond pulse via line 268 to the line 282 connected between calibrating control logic 74 and vertical integrator 60, to thereby shift the horizontal sweeps 20 mils vertically downwardly with respect to the horizontal sweeps on the first scan. If an error is not detected at the end of the second scan, AND gate 216 is again enabled to generate a CALIBRATE COMPLETED signal which is sent to the CPU.

However, if an error is detected, flip latch 200 is set by ERROR SCAN, and consequently, AND gate 213 is enabled by the reset condition of flip-flop 206 and the RESET HORIZONTAL SCAN signal generated at the end of the scan. The output of AND gate 213 commands the SEEK CONTROL to seek once more to the seek point or reference coordinate of the calibrate mark.

At the start of the third calibrate scan, flip-flop 204 is reset by the output of AND gate 248, and the resetting of flip-flop 204 sets flip-flop 206. The reset condition of flip-flop 204 conditions an AND gate 270 which on the vertical sweeps is enabled to pass a 4-microsecond pulse via line 274 to the line 86 connecting the calibrate control logic 74 and the horizontal integrator 62. Consequently, horizontal integrator is driven horizontally left 20 mils relative to the vertical sweep position on the first scan.

Similarly, during the horizontal sweeps of the third scan, AND gate 264 is enabled to pass the output of single shot 246 via line 278 to the line 80 connecting the calibrate control logic 74 and the vertical integrator 60. Consequently, the horizontal sweeps on the third scan are shifted 20 mils vertically upwardly. If an error is detected on this third scan, AND gate 215 is enabled at the end of the scan by the set condition of flip-flop 206 and the set condition of the calibrate error latch 200. The output of AND gate 215 sets an equipment check latch indicating to the CPU that the document is misregistered to such an extent that it cannot be read. If no errors are detected on the third scan, AND gate 216 is enabled, and the calibrate completed signal signals the calibrate control logic that a good calibrate has been performed.

When a good calibrate is completed on any of the three scans, i.e. a valid mark is detected, the displacement voltages are summed in the horizontal and vertical address DAC's 40, 44 and 48 to correct the seek point coordinates which are sent from the CPU to the character recognition system for reading other fields on the document. The horizontal shift for the vertical sweeps is present for the vertical sweeps but is removed for the horizontal sweeps, and the same is true of the vertical shift for the horizontal sweeps.

Figure 5:
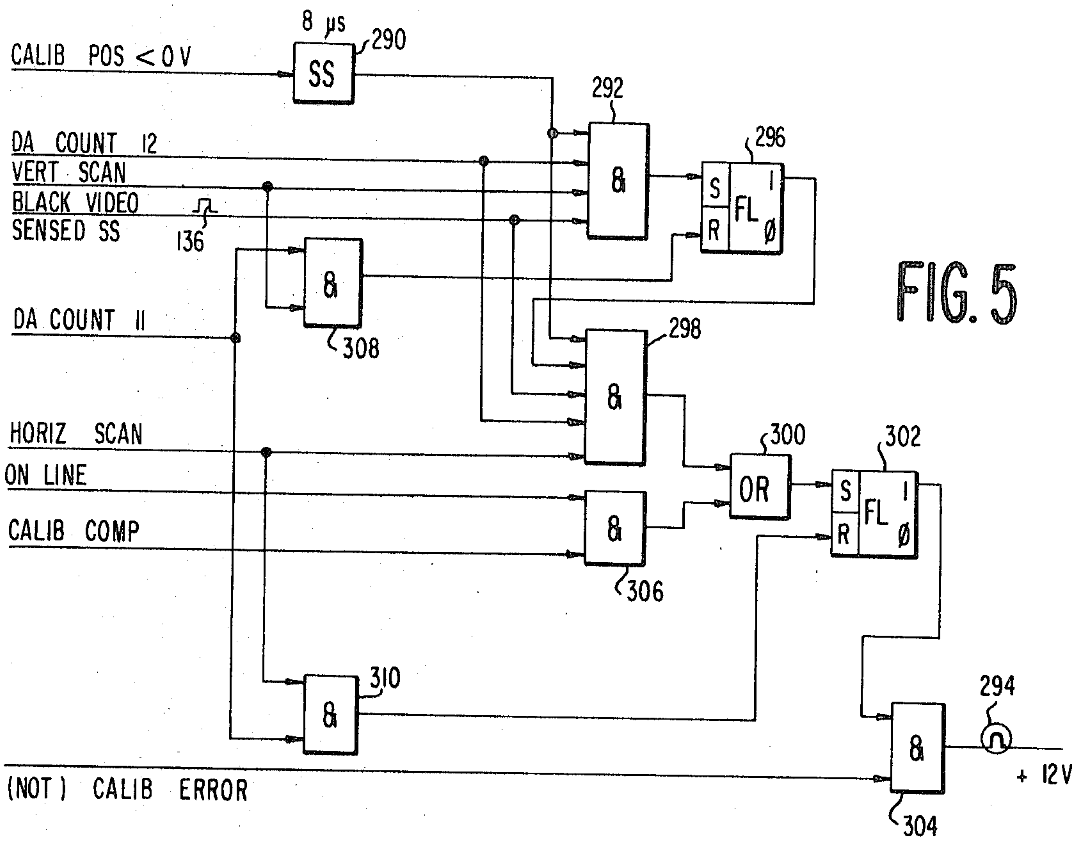
FIG. 5 is a logic block diagram illustrating the manner in which the reference coordinates of a calibrate mark are derived.

FIG. 5 is a block diagram illustrating the manner in which the original seek point or reference coordinates of the calibrate mark are derived. In order to obtain a ±200 mil correction in both horizontal and vertical directions by the error detection and correction system previously described, it is necessary that the reference coordinates be those of point 26, i.e. the intersection of the vertical and horizontal legs of the L-shaped calibrate mark.

A master document or the first document of a series of identical documents is placed in the reading station beneath the scanner 12. The CPU is disconnected from the horizontal and vertical DAC's 40 and 44 and instead they are controlled manually from an off line control panel. The operator controls suitable potentiometers for setting the horizontal and vertical addresses equal to the coordinates of point 26. The logic of FIG. 5 is then used to determine whether or not these coordinates have been properly selected within permissible tolerances. The output from the comparator 176 in FIG. 2 is used to fire an 8 microsecond single shot 290 whose output is applied to one input of a four input AND gate 292. Eight microseconds corresponds to 40 mils and forms a tolerance gate within which the 20 mil wide calibrate mark must be sensed in order to indicate a good calibrate by means of an indicating lamp 294 on the control panel. The other inputs to AND gate 292 are DA COUNT 12, VERTICAL SCAN, and BLACK VIDEO SENSED (from single shot 134). When all the inputs of AND gate 292 are enabled, flip latch 296 is set to condition one input of a horizontal scan AND gate 298. The other inputs to gate 298 are DA COUNT 12, BLACK VIDEO SENSED (the output of single shot 290) and HORIZONTAL SCAN.

Therefore, if both the vertical and horizontal scans are within the prescribed tolerances, the output of AND gate 298 is passed through an OR circuit 300 to set a GOOD CALIBRATE latch 302 which is ANDed with a NOT CALIBRATE ERROR signal at AND gate 304 to light the lamp 294. The latches 296 and 302 are reset at DA 11 time by AND gates 308 and 310, respectively.

The lamp 294 is also energized by CALIBRATION COMPLETED on the output of AND gate 216 (FIG. 4) thereby indicating in the on-line operation that a good calibrate or no error condition exists on one of the three calibrate scans. The on-line condition and the CALIBRATE COMPLETE signal are ANDed at AND gate 306 and passed through OR circuit 300 to set latch 302.

While the invention has been particularly shown and described with reference to preferred embodiments thereof, it will be understood by those skilled in the art that various changes in form and details may be made therein without departing from the spirit and scope of the invention.

What is claimed is:

1. In a document reading apparatus including scanning means for scanning a document to sense a calibrate mark thereon which is indicative of the position of said document relative to said scanning means, the improvement comprising:

(a) means for causing said scanning means to scan a first time said document with a first plurality of spaced sweeps at a reference position thereon, (b) first error detecting means for detecting an error in said calibrate mark relative to said reference position, and (c) means responsive to said first error detecting means for causing said scanning means to scan a second time said document at a second position shifted relative to said reference position by a distance substantially greater than the spacing between individual ones of said plurality of sweeps.

2. The document reading apparatus as defined in claim 1 wherein the second scan consists of a second plurality of sweeps and said first error detecting means comprises means for detecting an error if said calibrate mark is not sensed on each of said sweeps.

3. The document reading apparatus as defined in claim 2 wherein said first error detecting means comprises means for detecting an error if said mark is not sensed at the same point on each of said sweeps.

4. The improved document reading apparatus as defined in claim 1 further comprising:
(a) second error detecting means for detecting an error in said calibrate mark relative to said second position, and
(b) means responsive to said second error detecting means for causing said scanning means to scan said document in a third position shifted relative to said reference position.

5. In a document reading apparatus including scanning means for scanning a document to sense a calibrate mark thereon which is indicative of the position of said document relative to said scanning means, the improvement comprising:
(a) means for causing said scanning means to scan a first time said document at a reference position thereon,
(b) first error detecting means for detecting an error in said calibrate mark relative to said reference position,
(c) means responsive to said first error detecting means for causing said scanning means to scan a second time said document at a second position shifted relative to said reference position,
(d) second error detecting means for detecting an error in said calibrate mark relative to said second position, and
(e) means responsive to said second error detecting means for causing said scanning means to scan said document in a third position shifted relative to said reference position,
(f) said second position being shifted a predetermined amount in a first direction relative to said reference position, and
(g) said third position being shifted said predetermined amount relative to said reference position in a direction opposite to said first direction.

6. The improved document reading apparatus as defined in claim 5 further comprising:

(a) a third error detecting means for detecting an error in said calibrate mark relative to said third position, and
(b) means responsive to said third error detecting means for rejecting said document.

7. In a document reading apparatus including scanning means for scanning a document to sense a calibrate mark thereon which is indicative of the position of said document relative to said scanning means, the improvement comprising:
(a) means for causing said scanning means to scan a first time said document at a reference position thereon,
(b) first error detecting means for detecting an error in said calibrate mark relative to said reference position,
(c) means responsive to said first error detecting means for causing said scanning means to scan a second time said document at a second position shifted relative to said reference position, and
(d) means for recognizing a correct calibrate mark in said second position and for producing a difference signal indicative of the displacement between said reference and said second positions.

8. The improved document reading apparatus defined in claim 7 wherein said scanning means includes a cathode ray tube with means for storing predetermined deflection signals identifying coordinates of data on said document and further comprising means for modifying said predetermined deflection signals in accordance with said difference signal.

References Cited

Anderson et al.: IBM Technical Disclosure, vol. 10, No. 5, October 1967, pp. 612–616.

RODNEY D. BENNETT, Primary Examiner

J. G. BAXTER, Assistant Examiner

U.S. Cl. X.R.

340—347

UNITED STATES PATENT OFFICE
CERTIFICATE OF CORRECTION

Patent No. 3,536,950 Dated October 27, 1970

Inventor(s) David L. Johnston, Paul E. Nelson, and Gordon F. Hoffmann

It is certified that error appears in the above-identified patent and that said Letters Patent are hereby corrected as shown below:

Column 4, line 42 - "back" should be "black"

Column 6, lines 12-13 - "which scan" should be "each scan"
line 22 - "comprises" should be "compares"
line 26 - -V should be +V
lines 40-41 - "analogoutput" should be "analog output"
line 53 - comma (,) should be deleted after "reference"

Column 7, line 69 - "gate 784" should be "gate 184"

Column 8, line 23 - "avaiable" should be "available"
line 35 - "leads" should be "loads"
line 68 - "scanningbeams" should be "scanning beam Column 9, line 24 - "completes" should be "complete"
line 25 - "gate 202" should be "gate 262"

Signed and sealed this 30th day of March 1971.

(SEAL)
Attest:

EDWARD M.FLETCHER,JR.
Attesting Officer

WILLIAM E. SCHUYLER, JR.
Commissioner of Patents